(12) United States Patent
Kaji et al.

(10) Patent No.: US 8,155,881 B2
(45) Date of Patent: Apr. 10, 2012

(54) SELECTION ITEM DISPLAY DEVICE, SELECTION ITEM DISPLAY METHOD, SELECTION ITEM DISPLAY PROGRAM, AND RECORDING MEDIUM IN WHICH SELECTION ITEM DISPLAY PROGRAM IS RECORDED

(75) Inventors: Masayo Kaji, Kawasaki (JP); Naoaki Horiuchi, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 213 days.

(21) Appl. No.: 12/682,681

(22) PCT Filed: Oct. 10, 2007

(86) PCT No.: PCT/JP2007/069726
§ 371 (c)(1),
(2), (4) Date: Apr. 12, 2010

(87) PCT Pub. No.: WO2009/047842
PCT Pub. Date: Apr. 16, 2009

(65) Prior Publication Data
US 2010/0250110 A1 Sep. 30, 2010

(51) Int. Cl.
*G01C 21/00* (2006.01)
(52) U.S. Cl. ........ 701/426; 715/810; 715/821; 715/840; 345/173; 345/902; 400/83; 112/445; 340/286.13; 348/468
(58) Field of Classification Search .................. 701/426; 715/810, 821, 840; 345/173, 902; 400/83; 112/445; 348/468; 725/37; 340/286.13; 396/318
See application file for complete search history.

(56) References Cited

U.S. PATENT DOCUMENTS

| 5,231,584 | A  | * | 7/1993 | Nimura et al. | 701/202 |
| 5,537,324 | A  | * | 7/1996 | Nimura et al. | 701/208 |
| 6,064,941 | A  | * | 5/2000 | Nimura et al. | 701/210 |
| 6,339,746 | B1 | * | 1/2002 | Sugiyama et al. | 701/209 |
| 6,415,224 | B1 | * | 7/2002 | Wako et al. | 701/208 |
| 6,714,863 | B2 | * | 3/2004 | Katayama et al. | 701/209 |
| 7,043,699 | B2 | * | 5/2006 | Obradovich | 715/790 |
| 7,519,922 | B2 | * | 4/2009 | Obradovich | 715/833 |
| 7,802,198 | B2 | * | 9/2010 | Obradovich | 715/790 |

FOREIGN PATENT DOCUMENTS

| JP | 2004-078888 | 3/2004 |
| JP | 2004-132740 | 4/2004 |
| JP | 3585837 | 8/2004 |
| JP | 2005-207976 | 8/2005 |
| JP | 2006-064440 | 3/2006 |

OTHER PUBLICATIONS

International Search Report—PCT/JP2007/069726—Jan. 15, 2008.

\* cited by examiner

*Primary Examiner* — James Trammell
*Assistant Examiner* — McDieunel Marc
(74) *Attorney, Agent, or Firm* — Young & Thompson

(57) ABSTRACT

A selection item display device allows the user to select a desired selection item in the case where a surrounding situation changes, with improved operability. The device includes: storage element for storing a selection item; retrieval element for retrieving a selection item to be displayed based on a surrounding situation from the storage element; generation element for generating an image of the retrieved selection item; display element for displaying the generated image of the selection item on a display screen; designation element for designating a selection item to be maintained from the displayed selection item; and holding element for holding the designated selection item. Even if the surrounding situation changes, and the retrieval element changes the selection item to be displayed, the generation element leaves the image of the selection item to be maintained on the basis of an instruction from the holding element on the display screen.

9 Claims, 5 Drawing Sheets

SELECTION ITEM DISPLAY DEVICE, SELECTION ITEM DISPLAY METHOD, SELECTION ITEM DISPLAY PROGRAM, AND RECORDING MEDIUM IN WHICH SELECTION ITEM DISPLAY PROGRAM IS RECORDED

TECHNICAL FIELD

The present invention relates to a selection item display device, a selection item display method, a selection item display program, and a recording medium in which a selection item display program is recorded, and more particularly, relates to a selection item display device, a selection item display method, a selection item display program, and a recording medium in which a selection item display program is recorded, for displaying a selection item retrieved on the basis of a surrounding situation on a display screen.

BACKGROUND ART

A selection item display device will be described using a vehicle navigation system as an example. In a conventional vehicle navigation system, a selection item which can be selected by the user is displayed on a screen on the basis of a surrounding situation during travel of a vehicle. For example, when the vehicle travels on a freeway, a selection item for retrieving a service area/parking area, a selection item for retrieving a point to change to a general load, and the like are displayed. The user can select those selection items when desired.

As the selection item, an item displayed on the screen is determined on the basis of a surrounding situation during travel of the vehicle. When the surrounding situation changes, selection items displayed on the screen change. For example, when the vehicle travels on a freeway, a selection item for retrieving a service area/parking area is displayed on the screen. When the vehicle changes from the freeway to a general road, the selection item for retrieving a serving area/parking area is deleted from the screen and other selection items are displayed on the screen for the reason that there are no service areas/parking areas in general roads.

An example of patent documents which shows conventional vehicle navigation systems is the following patent document 1.

Patent document 1: Japanese Patent No. 3,585,837

In the patent document 1, an action proposing apparatus for proposing an action to the user in combination with information on time, place, and situation is described.

DISCLOSURE OF THE INVENTION

In the conventional technique, as described above, a selection item to be displayed on the screen is determined on the basis of a surrounding situation during travel of a vehicle. When the surrounding situation changes, a selection item displayed on the screen is changed.

Consequently, for example, in the case where a selection item for retrieving a convenience store is displayed on the screen during travel of a vehicle, when the surrounding situation changes, the selection item for retrieving a convenience store is deleted from the screen and another selection item is displayed on the screen.

In such a case, sometimes, although it is unnecessary to retrieve a convenience store at present, the user presently wishes to retrieve a convenience store later. However, when the surrounding situation changes, there is a case that the selection item for retrieving a convenience store is deleted from the screen. There is a problem such that it is inconvenient for the user from the viewpoint of operation.

The present invention has been achieved in view of the problem. It is an example of the object of the invention to provide a selection item display device, a selection item display method, a selection item display program, and a recording medium in which a selection item display program is recorded, allowing the user to select a desired selection item even in the case where a surrounding situation changes, and realizing improved operability.

MEANS FOR SOLVING THE PROBLEM

In order to solve the above problem, the invention according to claim 1 relates to a selection item display device comprising:

a storage storing device which stores a selection item;

a retrieval device which retrieves a selection item to be displayed on the basis of a surrounding situation from the storage device, and which changes the selection item to be displayed in the case where the surrounding situation changes;

a generation device which generates an image of the retrieved selection item;

a display device which displays the generated image of the selection item on a display screen;

a designation device which designates a selection item to be maintained from the displayed selection item; and a holding device which holds the designated selection item, wherein in the case where the surrounding situation changes, and the device changes the selection item to be displayed, the generation device leaves the image of the selection item to be maintained on the basis of an instruction from the holding device on the display screen.

In order to solve the above problem, the invention according to claim 8 relates to a selection item display method comprising:

a process of storing a selection item in a storage device;

a process of retrieving a selection item to be displayed from the storage device on the basis of a surrounding situation, and of changing the selection item to be displayed in the case where the surrounding situation changes;

a process of generating an image of the retrieved selection item;

a process of displaying the generated image of the selection item on a display screen;

a process of designating a selection item to be maintained from the displayed selection item; and a process of holding the designated selection item, wherein in the case where the surrounding situation changes, and the selection item to be displayed is changed by the retrieval process, the image of the selection item to be maintained is left by the generation process on the basis of an instruction in the hold process on the display screen.

In order to solve the above problem, the invention according to claim 10 relates to a recording medium in which a selection item display program is recorded so that it can be read by a computer, the selection item display program making the computer function as a selection item display device according to claim 1.

DESCRIPTION OF REFERENCE NUMERALS

Figure 1:
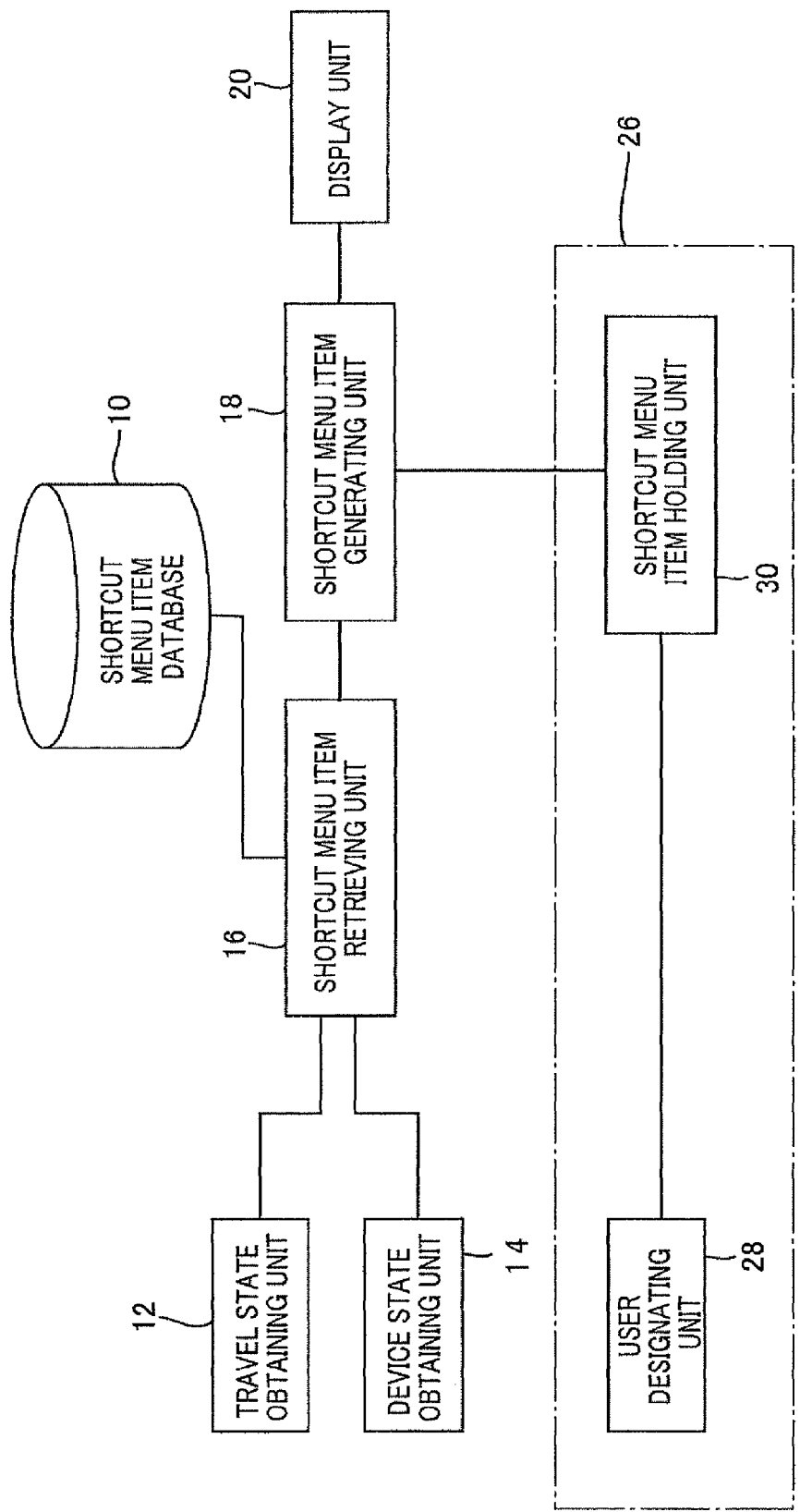
FIG. 1 is a block circuit diagram of a selection item display device according to an embodiment.

10: shortcut menu item database
12: travel state obtaining unit
14: device state obtaining unit
16: shortcut menu item retrieving unit
18: shortcut menu item generating unit
20: display unit
22: display screen
24-1 . . . 25-1: shortcut menu item
26: block
28: user designating unit
30: shortcut menu item holding unit
32: "CHANGE" item
34-1 . . . 34-5: "HOLD" item
S1 . . . S11: step

BEST MODE FOR CARRYING OUT THE INVENTION

A best mode for carrying out the present invention will now be described with reference to FIGS. 1 to 6. The embodiment described below relates to the case where the present invention is applied to a vehicle navigation system.

FIG. 1 shows block circuits of a selection item display device according to the embodiment.

In FIG. 1, reference numeral 10 denotes a database storing a shortcut menu item which is displayed on a screen for vehicle navigation and can be selected by the user. An example of the shortcut menu item is an item for retrieving a service area/parking area displayed on the screen for vehicle navigation when a vehicle is travelling on a highway.

As compared with a method of selecting a desired menu item in order from hierarchy, in the case where the shortcut menu item is set, a desired menu item can be selected easily.

Reference numeral 12 denotes an obtaining unit that obtains a traveling state of a vehicle and, for example, when a vehicle travels on a freeway, obtains the state. Reference numeral 14 denotes a device state obtaining unit and, for example, obtains a reproduction state of an audio device.

Reference numeral 16 denotes a retrieving unit that retrieves a shortcut menu item to be displayed on a screen for navigation. Concretely, the retrieving unit 16 retrieves a shortcut menu item to be displayed on the screen for navigation from the database 10 on the basis of the states obtained in the obtaining units 12 and 14.

An output from the retrieving unit 16 is supplied to a generating unit 20. The generating unit 18 generates an image of the shortcut menu item retrieved by the retrieving unit 16 and supplies it to a display unit 20. The display unit 20 has a display screen for navigation and displays the generated image of the shortcut menu item on the display screen.

Figure 2:
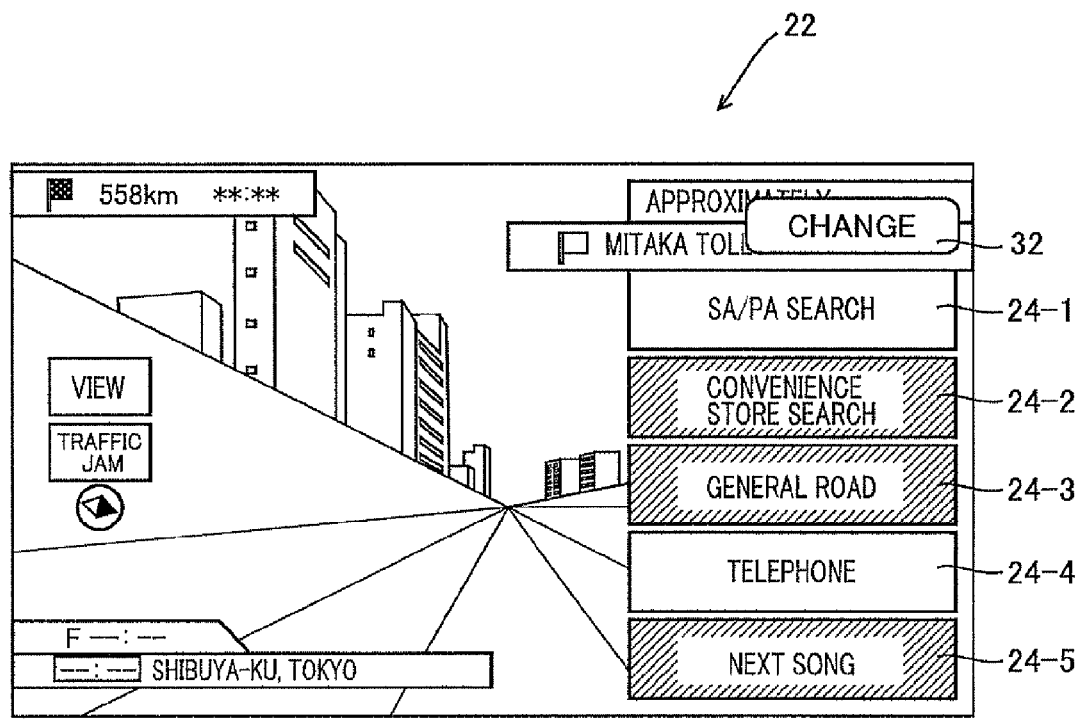
FIG. 2 is a diagram showing an example of a display screen of the selection item display device according to the embodiment.

The generated image of the shortcut menu item is displayed on the display screen of the display unit 20 and this state is shown in FIG. 2.

In FIG. 2, on a display screen 22, five shortcut menu items 24-1 to 24-5 are displayed. For example, the shortcut menu item 24-1 indicates SA (Service Area)/PA (Parking Area) retrieval. When the user wishes to select the SA/PA search, in the case where the menu item 24-1 itself is constructed by a touch panel switch, by touching the menu item 24-1, the SA/PA search is selected and executed.

In FIG. 2, the color of the menu items 24-2, 24-3, and 24-5 out of the menu items 24-1 to 24-5 is different from the color of the other menu items. This point will be described below.

In FIG. 2, the data in the shortcut menu items 24-1 to 24-5 changes as the vehicle travels. For example, as the vehicle travels, there is a case that the menu item 24-2 indicative of convenience store search is changed to data of the next candidate (for example, switched to radio).

In such a case, although it is unnecessary to retrieve a convenience store at present, the user may think that he/she will wish to retrieve a convenience store later. Therefore, the image of the menu item (for example, the menu item 24-2 indicative of convenience store search) desired to be maintained by the user is left in the screen 22. In FIG. 2, the menu items to be maintained are 24-2, 24-3, and 24-5. The color of the menu items 24-2, 24-3, and 24-5 is changed so that the menu items are discriminated from the other menu items, that is, the menu items 24-1 and 24-4 which are not maintained.

For the above reason, the color of the menu items 24-2, 24-3, and 24-5 differs from the color of the other menu items.

To discriminate the menu items 24-2, 24-3, and 24-5 to be maintained from the menu items 24-1 and 24-4 which are not maintained, except for the method of making the colors different, various other methods can be applied.

The configuration for leaving an image of a menu item desired to be maintained by the user as described above is shown by block 26 indicated by a chain line in FIG. 1.

In the block 26 in FIG. 1, a user designating unit 28 and a shortcut menu item holding unit 30 are provided. In the user designating unit 28, a shortcut menu item to be maintained out of the shortcut menu items displayed in the display screen 22 in the display unit 20 is designated by the user. In the case where the menu items 24-1 to 24-5 themselves are constructed by touch panel switches, an example of the user designating unit 28 is touch on the menu items 24-1 to 24-5 for long time. In the case where a mechanical switch (not shown) is disposed near the menu items 24-1 to 24-5, an example of the user designating unit 28 is operation of the mechanical switch.

An output from the designating unit 28 is supplied to the holding unit 30, and the holding unit 30 holds the shortcut menu item to be maintained. An output from the holding unit 30 is supplied to the generating unit 18, and the generating unit 18 leaves an image of the menu item held in the holding unit 28, that is, the menu item designated to be maintained by the user on the screen 22 of the display unit 20.

As described above, by the block circuit of FIG. 1, the image of the menu item designated to be maintained by the user is left on the screen 22 of the display unit 20.

In FIG. 2, reference numeral 32 indicates the item of "CHANGE" displayed on the screen 22 of the display unit 20. In the following, the item 32 of "CHANGE" will be described.

In FIG. 2, the menu items 24-1 to 24-5 are displayed. The menu items 24-2, 24-3, and 24-5 in those menu items are menu items designated to be maintained by the user, and the other menu items 24-1 and 24-4 are menu items which are not designated to be maintained. The data of the menu items 24-1 and 24-4 is changed to data of another candidate as the vehicle travels as described above. The present data of the menu items 24-1 and 24-4, that is, "SA/PA search" and "telephone" is data which is not desired by the user.

In such a case, when the user selectively operates the item 32 of "CHANGE", the data of the menu items other than the menu items designated to be maintained by the user, that is, the menu items 24-1 and 24-4 is changed to data of the next candidate. That is, by the operation on the item 32 of "CHANGE" by the user, the data "SA/PA search" and "telephone" of the menu items 24-1 and 24-4 is changed to data of the next candidates, for example, "go to GS" and "200 m scale".

An output signal based on the operation on the item 32 of "CHANGE" is supplied to, for example, the menu item retrieving unit 16 in FIG. 1. On the basis of the output signal, the menu item retrieving unit 16 retrieves the menu item of the next candidate.

Figure 3:
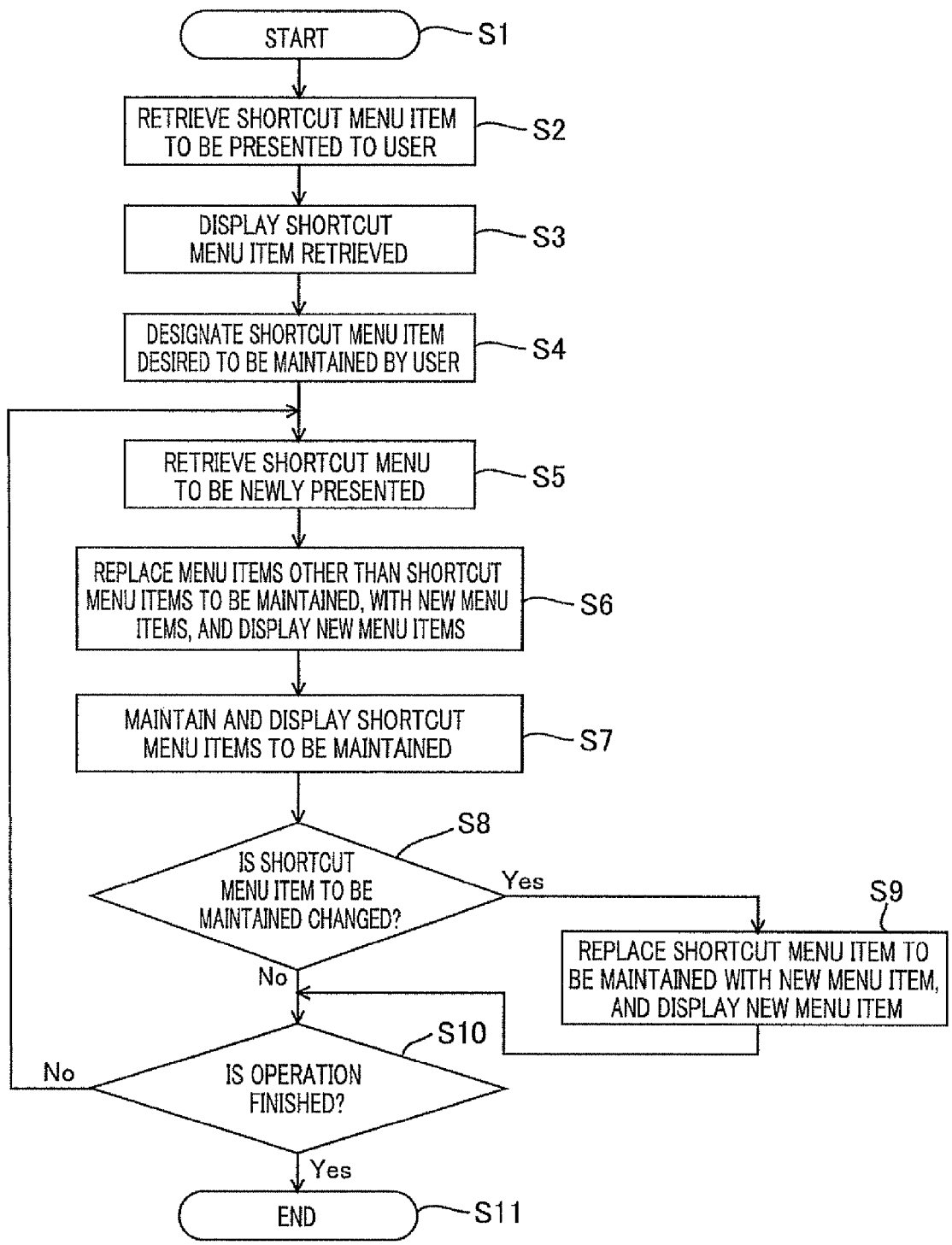
FIG. 3 is a flowchart of the selection item display device according to the embodiment.

FIG. 3 shows a flowchart of the selection item display device according to the embodiment.

In FIG. 3, the routine starts in step S1. In step S2, on the basis of surrounding situation (for example, situation of a road), a shortcut menu item to be presented to the user is retrieved. In step S3, the retrieved shortcut menu item is displayed. As shown in FIG. 2, the menu items 24-1 to 24-5 are displayed on the screen 22.

In step S4, the shortcut menu item desired to be maintained by the user is designated. In FIG. 2, the menu items 24-1 to 24-5 are displayed on the screen 22. The color of the menu items 24-2, 24-3, and 24-5 desired to be maintained by the user is made different from that of the other menu items.

In step S5, when the surrounding situation changes (for example, when the vehicle travels and the situation of the road changes) or when the item 32 of "CHANGE" shown in the screen 22 of FIG. 2 is selected, a shortcut menu item to be newly presented to the user is retrieved.

In step S6, the menu items other than the shortcut menu items to be maintained are replaced with the new menu items retrieved in step S5, and the new menu items are displayed. In step S7, the shortcut menu items to be maintained are maintained and displayed.

The state after step S7 will be described with reference to FIG. 2. The menu items 24-1 and 24-4 other than the shortcut menu items to be maintained are replaced with new menu items and the new menu items are displayed. On the other hand, the shortcut menu items 24-2, 24-3, and 24-5 to be maintained are maintained and displayed.

In step S8, whether the shortcut menu items to be maintained are changed or not is determined. In the case of "Yes" in step S8, the routine advances to step S9 where the menu items to be maintained are replaced with new menu items, and the new menu items are displayed. The routine advances to step S10. Examples of the case of changing the shortcut menu items to be maintained in step S8 include the case where a menu item to be maintained is selected and executed by the user (for example, in the case where the user selects and executes a menu item of retrieving a convenience store in a state where the menu item of convenience store search is maintained), the case where the user cancels maintaining of the menu item to be maintained, and the case where a menu item to be maintained becomes unable to be selected and executed (for example, although the menu item of SA/PA search is selected and executed, the vehicle moves from a freeway to a general road). With respect to the case where the menu item to be maintained becomes unable to be selected and executed, a warning indicative of the case can be issued before the selection/execution actually becomes impossible.

In the case where the menu item to be maintained is not changed in step S8, the routine advances to step S10.

Whether the operation of displaying the menu items is finished or not is determined in step S10. In the case of finishing the operation in step S10, the routine advances to step S11 and finishes the operation. The case of finishing the operation of displaying the menu items is, for example, the case where the user gets off the vehicle and it becomes unnecessary to display menu items.

In the case where the operation is not finished in step S8, the routine returns to step S5 and performs the operations in step S5 and subsequent steps.

The flowchart of FIG. 3 has been described above.

Figure 4:
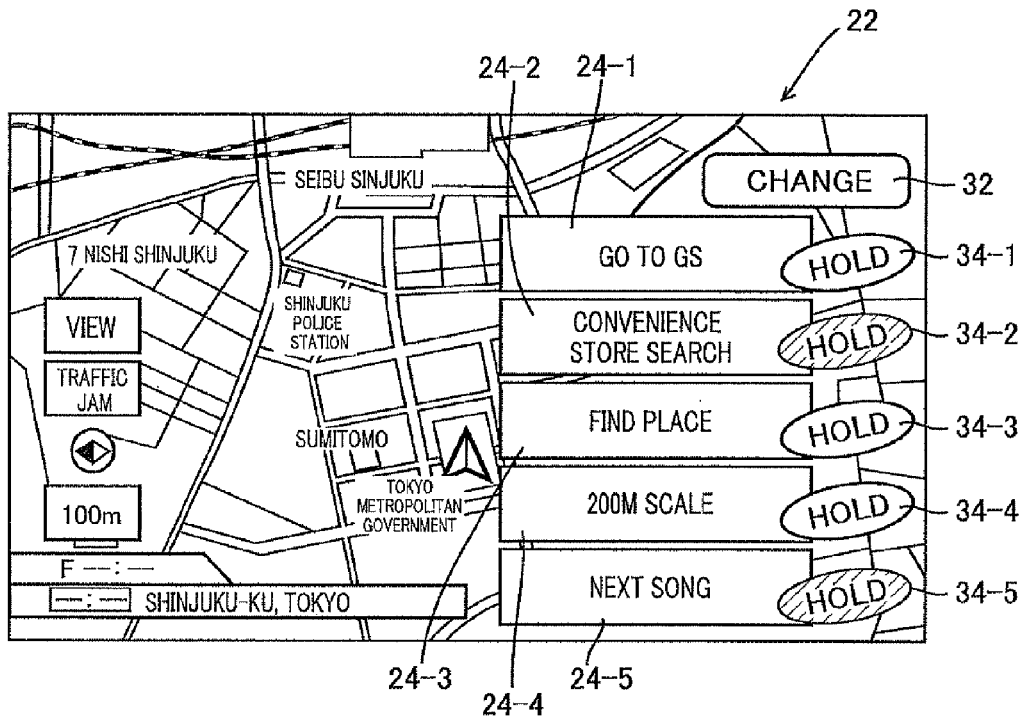
FIG. 4 is a diagram showing another example of a display screen of the selection item display device according to the embodiment.
Figure 5:
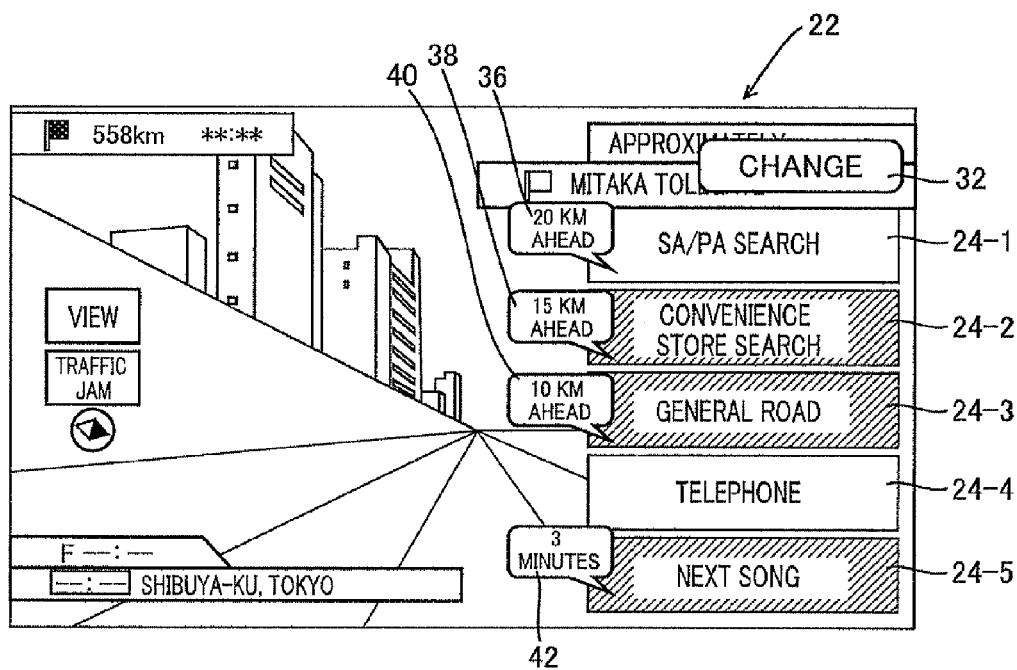
FIG. 5 is a diagram showing further another example of the display screen of the selection item display device according to the embodiment.
Figure 6:
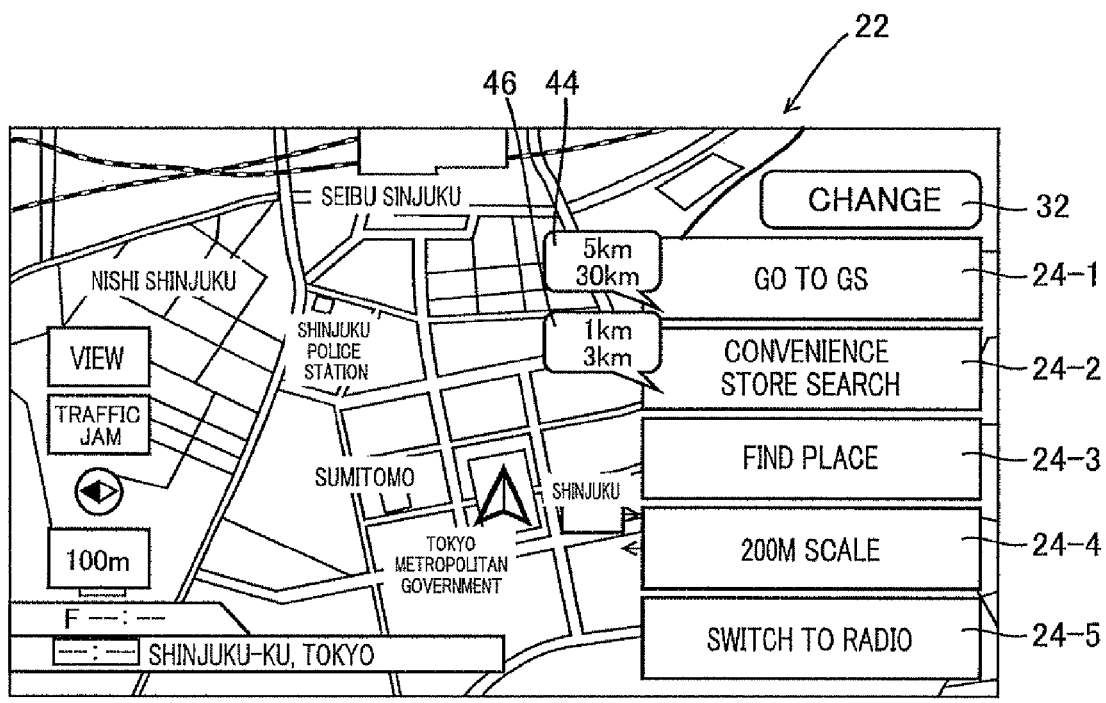
FIG. 6 is a diagram showing further another example of the display screen of the selection item display device according to the embodiment.

FIGS. 4 to 6 show various examples of the display screen of the selection item display device according to the embodiment.

First, FIG. 4 will be described.

In the display screen 22 of FIG. 4, near the menu items 24-1 to 24-5, items 34-1 to 34-5 of "HOLD" for maintaining the menu items 24-1 to 24-5 are displayed, respectively. The items 34-1 to 34-5 of "HOLD" are constructed by touch panel switches.

In the case where the user desires to maintain any of the menu items 24-1 to 24-5, the user operates not the menu item itself but any of the items 34-1 to 34-5 of "HOLD" corresponding to the menu item desired to be maintained. For example, in the case where the user desires to maintain the menu item 24-2 of "convenience store selection" and the menu item 24-5 of "next song" on the screen 22 in FIG. 4, the user operates the items 34-2 and 34-5 of "HOLD" corresponding to the menu items 24-2 and 24-5. By the operation, the color of the items 34-2 and 34-5 of "HOLD" is changed so as to be discriminated from the color of the other items 34-1, 34-3, and 34-4 of "HOLD". In FIG. 4, the menu items are operated by touching the touch panel switches constructing the menu items 24-1 to 24-5.

Next, FIG. 5 will be described.

In the display screen 22 of FIG. 5, near the menu items 24-1 to 24-5, distance to destination designated by the menu item or time to the designated target is displayed. Specifically, in the case of the menu item 24-1 of SA/PA search, the distance to the SA/PA as a destination is 20 km as shown by reference numeral 36. In the case of the menu item 24-2 of convenience store search, the distance to a convenience store as a destination is 15 km as shown by reference numeral 38. Further, in the case of the menu item 24-3 of general road, the distance to a general road as a destination is 10 km as shown by reference numeral 40. In the case of the menu item 24-5 of next song, time to the start of the next song is three minutes as shown by reference numeral 42.

The user can determine a menu item to be maintained on the basis of the distances to the destination or the time to the target designated by the menu items (refer to the reference numerals 36 to 42) near the menu items 24-1 to 24-5 displayed on the display screen 22. On the display screen 22 of FIG. 5, the distance to SA/PA is 20 km as shown by reference numeral 36 and is far, so that the user does not maintain the menu item 24-1. On the other hand, the distance to a convenience store is 15 km and is near as shown by reference numeral 38, so that the user maintains the menu item 24-2. The distance to a general road is 10 km and is near as shown by reference numeral 40, so that the user maintains the menu item 24-3. Further, the time to start of the next song is three minutes and is short as shown by reference numeral 42, so that the user maintains the menu item 24-5.

Consequently, the color of the menu items 24-2, 24-3, and 24-5 to be maintained is changed so that the menu items are discriminated from the other menu items 24-1 and 24-4 which are not maintained.

Next, FIG. 6 will be described.

In the display screen 22 of FIG. 6, near each of the menu items 24-1 and 24-2 out of the menu items 24-1 to 24-5, two distances to the destination designated by the menu item are displayed. Specifically, in the case of the menu item 24-1 of "go to GS (gas station), the distance to a first GS as a first candidate of the destination is 5 km, and the distance to a second GS as the destination is 30 km as shown by reference numeral 46. In the case of the menu item 24-2 of convenience store search, the distance to a first convenience store as a first candidate of the destination is 1 km and the distance to a second convenience store as a second candidate of the destination is 3 km as shown by reference numeral 46.

The user can determine a menu item to be maintained on the basis of the two distances to the destination by each of the menu items near the menu items 24-1 to 24-5 displayed on the display screen 22 (refer to reference numerals 44 and 46). On the display screen 22 of FIG. 6, for example, the menu item 24-2 of convenience store search will be described. Since the distance to a convenience store as a first candidate is 1 km and is near as shown by reference numeral 46, the user tries to maintain the menu item 24-2 of convenience store search. On the other hand, the distance to a convenience store as a second candidate is 3 km and is also near. The user determines that he/she does not have to maintain the menu item 24-2 of convenience store search at present and selects not to maintain the menu item 24-2.

Consequently, on the display screen 22 of FIG. 6, all of the menu items 24-1 to 24-5 are not maintained and, therefore, have the same color.

Although two distances to a destination designated by each menu item are displayed on the display screen 22 of FIG. 6, alternatively, two times to a designated target can be displayed.

It is also possible to place priority on the menu items other than the menu items to be maintained designated by the user and change the menu items in ascending order of priority on the basis of changes in the surrounding situation.

Although the above-described embodiment relates to the case of applying the present invention to a vehicle navigation system, the present invention can be also applied to other devices such as a cellular phone.

The present invention is not limited to the foregoing embodiment. The embodiment is illustrative. Anything having substantially the same configuration and producing similar effects as the technical ideas described in the scope of claims of the present invention is included in the technical scope of the present invention.

The invention claimed is:

1. A selection item display device comprising:
a storage device which stores a selection item;
a retrieval device which retrieves a selection item to be displayed on the basis of a surrounding situation from the storage device, and which changes the selection item to be displayed in the case where the surrounding situation changes;
a generation device which generates an image of the retrieved selection item;
a display device which displays the generated image of the selection item on a display screen;
a designation device which designates a selection item to be maintained from the displayed selection item; and
a holding device which holds the designated selection item,
wherein in the case where the surrounding situation changes, and the retrieval device changes the selection item to be displayed, the generation device leaves the image of the selection item to be maintained on the basis of an instruction from the holding device on the display screen.

2. The selection item display device according to claim 1, wherein the display screen of the display device is a display screen for navigation, and the selection item is a selection item displayed on the display screen for navigation and used for navigation.

3. The selection item display device according to claim 1, wherein the surrounding situation is a situation of a road, and when the situation of the road changes, the retrieval device changes a selection item to be displayed.

4. The selection item display device according to claim 1, wherein near the selection item, a distance to a designation designated by using the selection item is displayed.

5. The selection item display device according to claim 1, wherein near the selection item, a plurality of distances to a destination designated by using the selection item are displayed.

6. The selection item display device according to claim 1, wherein near the selection item, a time to a designation designated by using the selection item is displayed.

7. The selection item display device according to claim 1, wherein near the selection item, a plurality of times to a destination designated by using the selection item are displayed.

8. A recording medium in which a selection item display program is recorded so that it can be read by a computer, the selection item display program making the computer function as a selection item display device according to claim 1.

9. A selection item display method comprising:
a process of storing a selection item in a storage device;
a process of retrieving a selection item to be displayed from the storage device on the basis of a surrounding situation, and of changing the selection item to be displayed in the case where the surrounding situation changes;
a process of generating an image of the retrieved selection item;
a process of displaying the generated image of the selection item on a display screen;
a process of designating a selection item to be maintained from the displayed selection item; and
a process of holding the designated selection item,
wherein in the case where the surrounding situation changes, and the selection item to be displayed is changed by the retrieval process, the image of the selection item to be maintained is left by the generation process on the basis of an instruction in the hold process on the display screen.

* * * * *